A. C. VIDRINE.
PLOW ATTACHMENT.
APPLICATION FILED OCT. 26, 1916.
1,227,508.
Patented May 22, 1917.
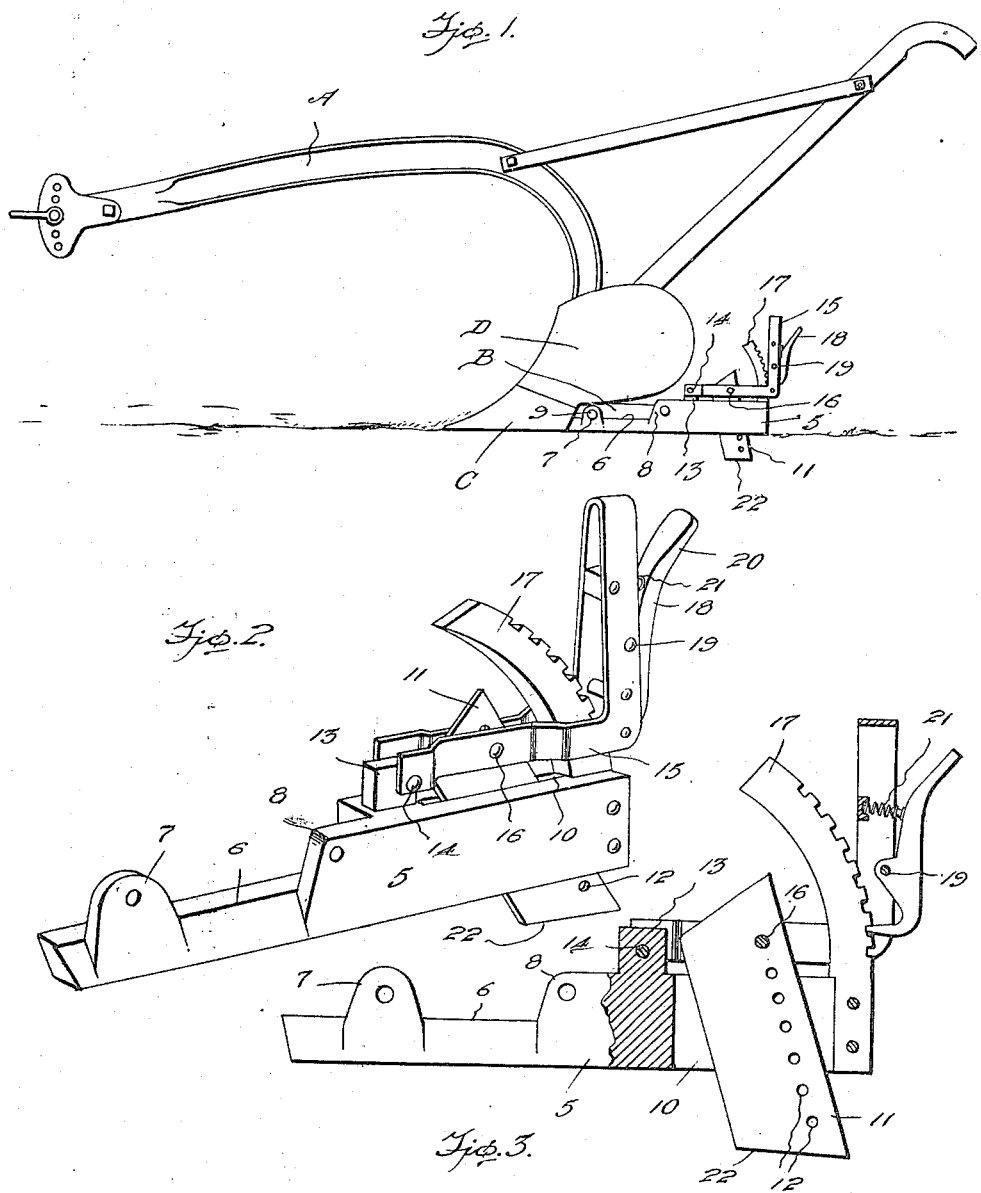

UNITED STATES PATENT OFFICE.

ACHILLE C. VIDRINE, OF DESHOTELS, LOUISIANA.

PLOW ATTACHMENT.

1,227,508.          Specification of Letters Patent.        Patented May 22, 1917.

Application filed October 26, 1916. Serial No. 127,851.

*To all whom it may concern:*

Be it known that I, ACHILLE C. VIDRINE, a citizen of the United States, residing at Deshotels, in the parish of St. Landry and State of Louisiana, have invented certain useful Improvements in Plow Attachments, of which the following is a specification, reference being had therein to the accompanying drawing.

The invention relates to a plow attachment, and more particularly to the class of adjustable guide attachments for lister middle burster landside plows.

The primary object of the invention is the provision of an attachment of this character wherein the same is readily mounted upon the frog of the plow at the heel thereof and will serve as an adjustable guide which can be moved to inactive position on the travel of the plow from one point to another so as to avoid any wear thereon and in the working of the plow in the ground the guide can be positioned for coöperation therewith.

Another object of the invention is the provision of a plow attachment of this character wherein the guide and the mode of adjustment thereof is of novel form and can be readily set to the desired position according to the working of the plow for the successful operation thereof.

A further object of the invention is the provision of a plow attachment of this character which can be readily and easily mounted upon the frog of the plow or detached therefrom and will afford a guide when the plow is in operation.

A still further object of the invention is the provision of a plow attachment of this character which is extremely simple in construction, readily and easily adjusted, thoroughly reliable and efficient in its purpose, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a side elevation of a plow of the middle-burster type, showing the attachment constructed in accordance with the invention applied thereto;

Fig. 2 is a perspective view of the attachment removed from the plow;

Fig. 3 is a vertical transverse sectional view through the attachment.

Similar reference characters indicate corresponding parts throughout the several views of the drawing.

Referring to the drawing in detail, A designates generally the plow beam, B the frog which supports the plowshare C and moldboards D, as usual, the same being fastened thereto in the ordinary well known manner. Upon this frog B is secured the guide attachment hereinafter fully described.

The guide attachment comprises a runner bar 5 which is cut away for a portion of its length at one side thereof, as at 6, to accommodate the heel end of the frog B and also form ears 7 and 8 through which are passed bolt members 9 or other suitable fasteners for securing the runner bar 5 to the frog at the heel thereof.

Formed in the runner bar 5 rearwardly of the cut away portion 6 is a vertical slot 10 in which is slidably fitted a guide plate 11 which forms a guide or rudder and has provided therein a series of spaced holes 12 arranged in a row longitudinally of the plate 11, while forwardly of the slot 10 and rising from the top of the bar 5 is a bearing 13 supporting a pivot 14 swingingly connecting to the said bearing the limbs of a bifurcated substantially L-shaped lever 15 which, in the bifurcation thereof, is adjustably received the guide plate 11, and the adjustment of this plate is effected by means of a bolt 16 which is passed transversely through the lever 15 and engages in any one of the holes 12 in said guide plate 11 so that the latter can be adjustably connected to the lever, as will be apparent.

At the rear end of the bar 5 and rising therefrom is a forwardly curved toothed rack extension 17 which projects through a bifurcation in the lever for the engagement with any one of its teeth of a locking dog 18 supported upon a pivot 19 mounted in the lever 15, and this dog is formed with a handle 20 against which works a spring 21 which is also mounted within the lever 15 and is designed to hold the dog 18 in locking engagement with the rack extension 17 and thereby sustain the guide plate 11 in its adjusted position, the lower end of the plate being formed with a beveled edge 22 so that this edge will be substantially parallel with the bottom face of the runner bar 5, and such plate 11 is adapted to be lowered or raised by the lever 15 for the adjustment thereof to bring the rudder into active or inactive position, and when in the latter position acts as a guide for the plow.

From the foregoing description, taken in connection with the accompanying drawing, the construction and operation of the herein described plow attachment will be readily apparent and, therefore, a more extended explanation has been omitted.

Having thus described my invention, I claim:

A guide attachment for a plow comprising a runner bar for positioning at the heel of the plow, a guide plate slidable through the runner bar and having a series of holes arranged in a longitudinal row, a bearing on the bar, a lever pivotally connected to the bearing, means on the lever and engageable in any one of the holes for adjustably connecting the plate thereto, a stationary rack on the bar, and a dog pivotally connected to the lever and engageable with the rack to hold said lever in adjusted position.

In testimony whereof I affix my signature.

ACHILLE C. VIDRINE.

Copies of this patent may be obtained for five cents each, by addressing the "Commissioner of Patents, Washington, D. C."